(No Model.) 2 Sheets—Sheet 1.
F. BENA.
TRICYCLE.
No. 517,019. Patented Mar. 27, 1894.
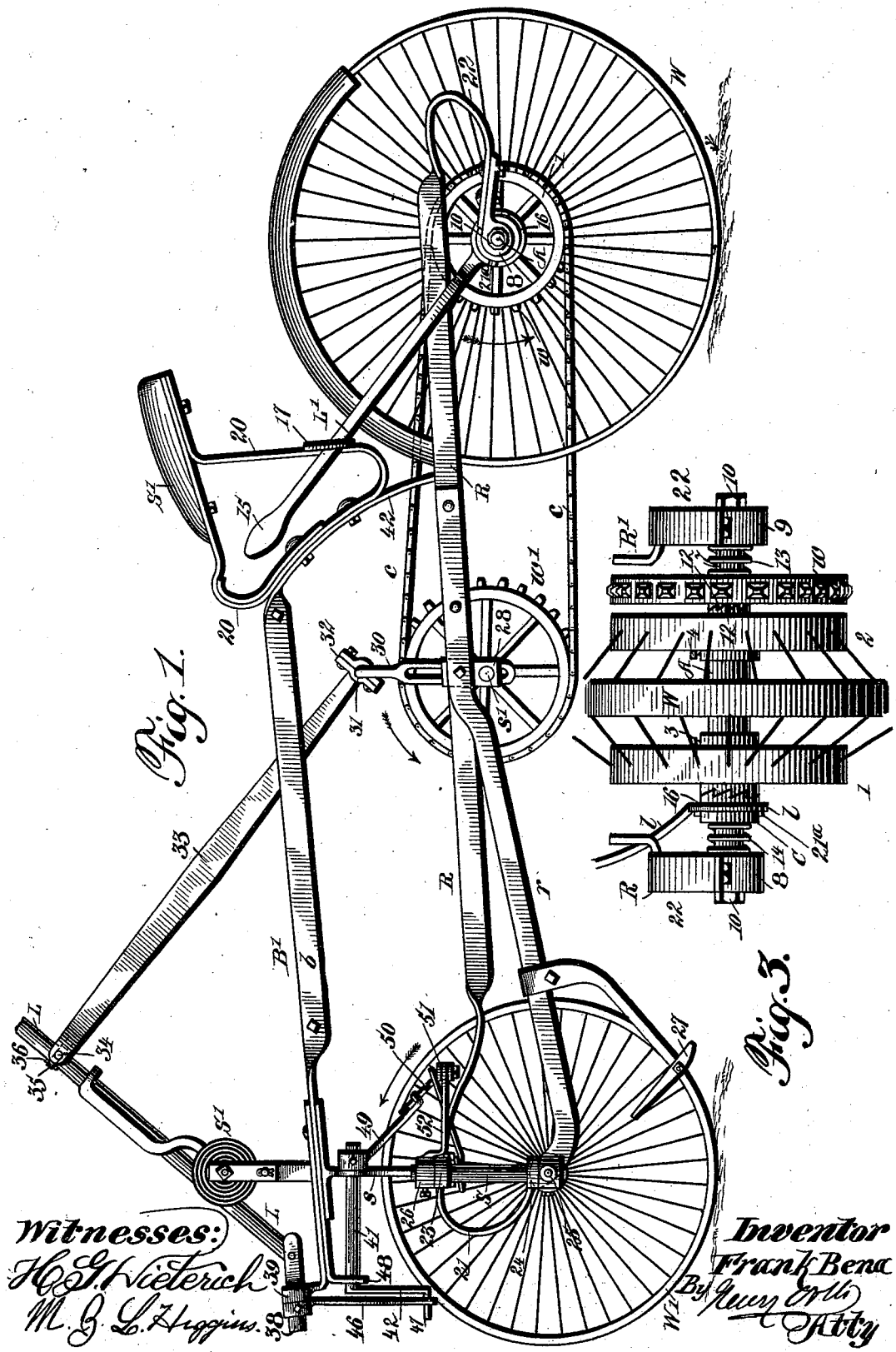

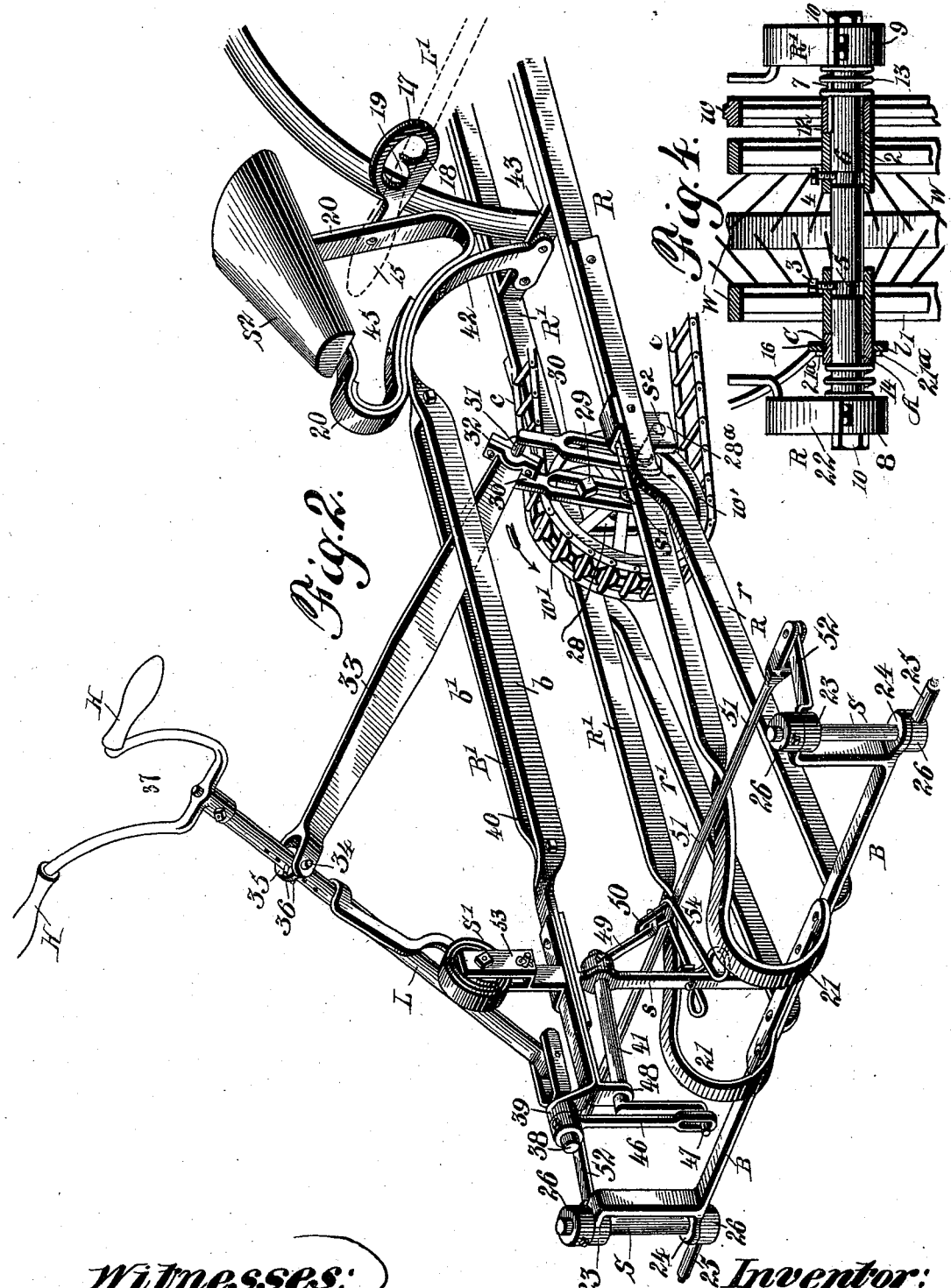

UNITED STATES PATENT OFFICE.

FRANK BENA, OF ST. LOUIS, MISSOURI.

TRICYCLE.

SPECIFICATION forming part of Letters Patent No. 517,019, dated March 27, 1894.

Application filed May 12, 1893. Serial No. 474,013. (No model.)

*To all whom it may concern:*

Be it known that I, FRANK BENA, a subject of the Emperor of Austria-Hungary, residing at St. Louis, State of Missouri, have invented certain new and useful Improvements in Tricycles; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention has relation to tricycles and it has for its object to simplify the construction and reduce the operative elements of the driving and steering gears or mechanisms, as well as lessen the labor necessary to the propulsion of the vehicle, as will now be fully described, reference being had to the accompanying drawings, in which—

Figure 1 is a side elevation of a tricycle embodying my improvements, one of the front wheels being removed. Fig. 2 is a perspective view illustrating the steering gear and its connection with the propelling lever. Fig. 3 is an elevation of the drive wheel axle, one of the chain driving wheels, part of the main driving wheel and the clutch mechanism for locking the main driving wheel to its axle, and Fig. 4 is a sectional elevation of the parts shown in Fig. 3.

Similar symbols indicate like parts wherever such may occur in the several figures of drawings described, and in these W, indicates the main driving wheel, which, as shown, has two hubs 1 and 2, loosely mounted on the wheel axle A, but held against endwise motion thereon by means of two bolts, 3 and 4, extending into peripheral grooves 5 and 6 respectively, formed in the axle A, as shown in Fig. 4. The outer face of both hubs 1 and 2 is provided with clutch teeth, Fig. 3. Upon the main axle A is loosely mounted the smaller chain wheel $w$, but so connected as to rotate therewith, as by a spline or feather 7, the inner face of the hub 12 being also provided with clutch teeth adapted to engage corresponding teeth on main wheel hub 2. On the outer ends of the axle are loosely mounted two hubs or bearings 8 and 9, to which is secured one end of a reach R, and R', held in position by suitable washers and a pin extending through the axle, or a nut 10, or in any other suitable manner. A coiled spring 13 on axle A, between the reach bearing 9 and smaller chain wheel $w$ tends to hold said wheel in a normal position to engage the clutch teeth on the face of the hub 2 of the main driving wheel, yet allows the chain wheel $w$ to move outwardly under pressure. A coupling sleeve C is loosely mounted on main wheel axle A, and provided with clutch teeth adapted to engage the corresponding teeth on hub 1 of main driving wheel W, and between said sleeve C and the bearing 8 for reach R is arranged a coiled spring 14, whose tension is exerted upon sleeve C to hold the same in engagement with the hub 1 of main wheel W. A lever L', terminating at one end in a handle 15 and at the other in a ring 16 serves to move the clutch sleeve C, and is secured in its respective positions in notches 18 and 19, formed in a lever support or slotted arm 17 secured to the seat spring or support 20, Figs. 1 and 2. The ring 16 of lever L' may be loosely mounted on the sleeve C, and held against outward motion by means of radial lugs 21ª on said sleeve C, so that when the lever L' is moved inwardly or toward the main wheel into notch 19 the sleeve will be moved outwardly or out of engagement with the hub 1 of the main driving wheel W, and when so disengaged said main driving wheel will revolve freely on axle A, as the clutch teeth on its hub 2 will then ride over the like teeth on the hub of chain wheel $w$, when the latter is held against rotation.

In order to prevent any clattering or noise which might result from the sliding of the clutch teeth on the hubs 2 and 12 over each other, the peripheral grooves 5 and 6 are preferably made of such width as to admit of sufficient endwise motion of the main wheel W on the axle A so that its hub 2 will be practically out of engagement with the hub 12 of the chain wheel $w$, without moving the hub 1 into engagement with the clutch sleeve C when said sleeve has been moved outwardly against the stress of its spring 14, that is to say, when the lever L' is moved into notch 19. As clearly shown in Fig. 3, the pitch of the teeth on the hubs 1, 2, and 12, and on the coupling sleeve C, lies in a direction opposite to the direction of rotation of the vehicle wheels, so that when chain wheel $w$ is revolved in the direction of its arrow Fig. 1, it will revolve the main wheel W in the same direction when the clutch faces are in engagement. This clutch mechanism has a two fold purpose, first to throw the driving mechanism out of operation on down grade travel, and secondly to admit of the stoppage of the vehicle by throwing the driving mechanism out of operation and immobilizing the main operating lever hereinafter referred to. It is obvious that the clutch lever ring 16 may be fitted in a peripheral groove formed in the clutch sleeve C, whereby said sleeve is moved positively by said lever in either direction, though this is not necessary, since the spring 14 will invariably move the sleeve inwardly whenever the lever L' is moved out of the notch 19 into the notch 18 of the lever support 17. A special fulcrum for the lever L' is also dispensed with, the reach R on which said lever has bearing serving as a fulcrum. The forward and rear ends 21 and 22 of both reaches R are twisted and bent into the form of springs, as shown in Figs. 1 and 2 for obvious purposes, and said resilient front ends of the reaches are secured to a yoke or substantially U-shaped bar B that has at each end two bearings 23, 24, for the standards S, on which are formed the axles for the fore or steering wheels W', said axles projecting horizontally from a cylindrical boss 26 formed at the lower end of the standards and abutting against the lower bearings 24 of the yoke or bar B, the standards being held in their bearings by means of a retaining sleeve $26^a$ keyed to their upper end. The yoke or U-shaped bar B is braced to the reaches R and R' by means of braces $r$ and $r'$ respectively, to which braces are secured the foot rests 27, one of which is shown in Fig. 1. The larger power transmitting chain wheel $w'$ is loosely mounted on a short spindle $s'$ secured to a bracket 28 that depends from reach R', and said wheel is connected with the smaller chain wheel $w$ on axle A by means of a driving chain $c$. The spindle $s'$ of the power transmitting wheel $w'$ passes through the slot of one of a pair of slotted links 30 and the said chain wheel $w'$ has a crank or wrist pin 29 that extends through the slot of one of said links 30, and is secured to the link by means of a nut, as shown, the other link being guided by and working on a stud $s^2$ secured to a bracket $28^a$ depending from reach R. The links 30 are formed on opposite ends of a cross-shaft 31, that is pivoted in a bearing 32 at one end of a connecting rod 33 whose opposite end is forked and pivoted on radial pins 34 projecting from a ring or sleeve 35, through which the operating and steering lever L passes loosely, said sleeve 35 being adjustable on the lever by means of pins 36 one above and the other below said sleeve.

To the upper end of the operating or working lever L is secured a pair of handles H, the frame 37 for which is preferably U-shaped, as shown, whereby a better leverage is obtained than would be the case if the handle bar were arranged perpendicular to the lever as in ordinary steering bars, and whereby said lever is more readily or easily revolved in operating the steering gear, the lever performing the double function of power and steering lever. The lower end of the said power and steering lever L is pivoted in the forked end of a swivel stud or rock shaft 38, that has its bearing in a lug or ear 39, secured to the outer end of a slotted guide bar B', formed of two flat metal bars $b$ and $b'$ so united as to form a longitudinal guide slot 40 in which the connecting rod 33 is guided, the opposite ends of the bar $b$ being bent downwardly, the forward downwardly bent end constituting the bearing for a crank shaft 41, and the rear downwardly bent end an arm 42, by means of which the bar is rigidly connected with the reaches R and R' through the medium of a cross bar 43 secured to said reaches, see Fig. 2, and to said arm 42 is bolted or otherwise secured the more or less resilient seat support 20 to whose arms the seat $S^2$ is secured, the forward arm being stiffened or braced by a flat bar 45, Figs. 1 and 2, to better support the weight of the rider.

On the swivel stud or rock shaft 38 is secured a link 46 whose lower end is slotted for the reception of the wrist pin 47 on the crank of the shaft 41 above referred to, said shaft having its bearing in the downwardly bent lug or ear 48 of bar section $b$, and in a standard $s$ respectively secured to the yoke B and bar B', said standard serving at the same time as a support or brace for the forward end of said bar B'. To the rear end of the rock shaft 41 is secured a second crank 49 whose wrist pin or bent end works in the slot of the lug or ear 50 projecting from a steering bar 51 between the outer forked ends of which is pivoted a radial arm 52 formed on or secured to the retaining sleeves 26 for the standards S of the short forward axles 25. It is obvious that when lever L is turned in sleeve 35 in one or the other direction, the rock shafts 38, and 41, will be correspondingly revolved and the steering bar 51 moved in one or the other direction, thereby revolving the standards S and displacing the fore or steering wheels W' from a straight line parallel with the line of travel, to a line at a greater or less angle thereto, and thereby changing the direction of the vehicle to the right or left of said line of travel according to the direction in which the lever L is turned. By means of the described arrangement of yoke B and connection therewith of the steering wheels, the distance between the steering or guide wheels relatively to the longitudinal axial plane of the vehicle remains always the same, so that the center of gravity, or the weight of the rider relatively to the vehicle remains practically unchanged, which would, however, not be the case, were the fore-wheels W' mounted on a common axle adapted to be revolved about a central pivot. The displacement of the axle from a plane perpendicular to the longitudinal axial plane of the vehicle would cause both of said wheels to more or less approach said axial plane, and correspondingly shorten the distance between said wheels and said plane, rendering the vehicle liable to topple over should the center of gravity of the weight of the rider be displaced toward one or the other side of the said longitudinal axial plane of the vehicle.

S' is a leaf spring one end of which is connected with a shaft or bar secured in a bracket 53 bolted to the forward end of the reaches, the other end of said spring being connected with an arm that has bearing on the lever L, whereby said lever is automatically lifted from a depressed position in operating the driving crank 30, 31. As above described the said driving crank 30 31 is a slotted crank, and performs the function of a lever of variable length, which enables me to apply the driving power centrally to the vehicle, and to distribute the leverage or power applied evenly on opposite sides of the longitudinal axial plane of said vehicle, which could not be done were the connecting rod 33 connected directly with the wrist pin on the chain wheel w', as such crank would then have to be arranged on the outer face of the wheel, and one of the reaches would have to be dispensed with. It is obvious that by means of the construction described, a brake mechanism can be dispensed with and the vehicle can be stopped by simply holding the lever L immovable when the clutches are in engagement.

In order to assist the returning of the steering mechanism to its normal position, I employ the spring 54 secured to standard s, the arms of said spring having bearing on the opposite sides of the slotted lug 50 of the steering bar 51.

Having thus described my invention, what I claim as new therein, and desire to secure by Letters Patent, is—

1. In a tricycle, the combination with the driving and steering gears, of an operating lever common to both gears, a swiveled fulcrum stud for said lever, and crank connections connecting the lever and fulcrum stud with the driving and steering gears respectively.

2. In a tricycle, the combination with the driving gear, the fore wheels revoluble about horizontal and vertical spindles, a steering bar, and crank connections between the same and said vertical spindles, of an operating lever, a swiveled fulcrum stud therefor, and crank connections connecting the lever and fulcrum stud with the driving gear and steering bar respectively.

3. The combination with the frame bars R and R' provided with a stud and spindle respectively, and a power wheel loose on said spindle and provided with a crank or wrist pin, of a rock lever, a U-shaped crank having its arms slotted for the reception of the aforesaid stud and the wrist pin and end of the wheel spindle, and a connecting rod connecting said crank with the power lever, substantially as and for the purpose set forth.

4. The combination with the frame bars R, R', provided with a stud and spindle respectively, a slotted guide bar provided with a bearing at its forward end and a power wheel loose on the frame bar spindle and provided with a wrist pin, of a rock lever connected with the bearing on the slotted bar and working in the slot thereof, a U-shaped crank 31, having its arms 20 slotted for the reception of the end of said spindle and wrist pin and for the aforesaid stud, and a connecting rod adjustable lengthwise of the lever and connected with said crank, substantially as and for the purpose set forth.

5. In a tricycle, the combination with the main frame, the seat support secured thereto, the driving and steering gears, and a slotted bar supported from said frame and seat support respectively, of an operating lever common to both driving and steering gears, a swiveled fulcrum stud for said lever, said stud having its bearing in the forward end of the slotted bar, a crank and rod connection between the lever and driving gear, said rod guided and working in the aforesaid slotted bar, and a crank connection between the fulcrum stud and steering gear, for the purpose set forth.

6. In a tricycle, the combination with the driving gear a steering bar adapted to move in a plane perpendicular to the direction of motion of the cycle, and springs adapted to move the bar in opposite directions; of an operating lever, a swiveled fulcrum therefor, and crank connections between said lever and the driving gear and steering bar respectively, for the purpose set forth.

7. In a tricycle, the combination with the main driving wheel axle, the main driving wheel loose thereon, the hub of said wheel provided with clutch teeth on both faces, a power transmitting wheel revoluble with and having endwise motion on the axle, the hub of said wheel provided with clutch teeth adapted to engage the teeth on one of the faces of the hub of the main driving wheel, and a spring to hold said transmitting wheel in a normal position; of a clutch coupling sleeve on the axle and adapted to engage the teeth on the other face of the main driving wheel, a lever connected with the sleeve and adapted to move the coupling sleeve in one direction, and a spring adapted to move said sleeve in a reverse direction, substantially as and for the purpose set forth.

8. The axle A provided with peripheral grooves 5 and 6, the wheel W, the bolts 3 and 4 in the hub thereof said bolts extending into grooves 5 and 6, the wheel w connected with axle A by spline or feather, and the spring 13, in combination with the clutch coupling sleeve C, the spring 14 and lever L', said parts being constructed and adapted to operate substantially as and for the purpose set forth.

In testimony whereof I have hereto signed my name in the presence of two witnesses.

FRANK BENA.

Witnesses:
THOS. H. YOUNG,
H. G. DIETERICH.